A. CABRINI.
WEEDING MACHINE FOR RICE FIELDS.
APPLICATION FILED JAN. 27, 1920.

1,412,164.   Patented Apr. 11, 1922.

Inventor
A. Cabrini
By H. R. Kerslake
Attorney

UNITED STATES PATENT OFFICE.

ATTILIO CABRINI, OF MILAN, ITALY.

WEEDING MACHINE FOR RICE FIELDS.

1,412,164.  Specification of Letters Patent.  Patented Apr. 11, 1922.

Application filed January 27, 1920. Serial No. 354,403.

*To all whom it may concern:*

Be it known that I, ATTILIO CABRINI, a subject of the Kingdom of Italy, residing at Milan, Corso Italia 25, Italy, have invented certain new and useful Improvements in Weeding Machines for Rice Fields, of which the following is a specification.

The process of treating the ground in rice fields as described in my pending application Serial No. 354,402 of Jany. 27, 1920, causes a growth of weeds and grass over the banks or sides of the furrows.

Of the disposition of said growth is taken advantage for weeding out, or cleansing the fields from said weeds when the rice has reached a certain growth.

The present invention refers to mechanical means for weeding out the fields in said circumstances.

Figures 1, 2, 3:
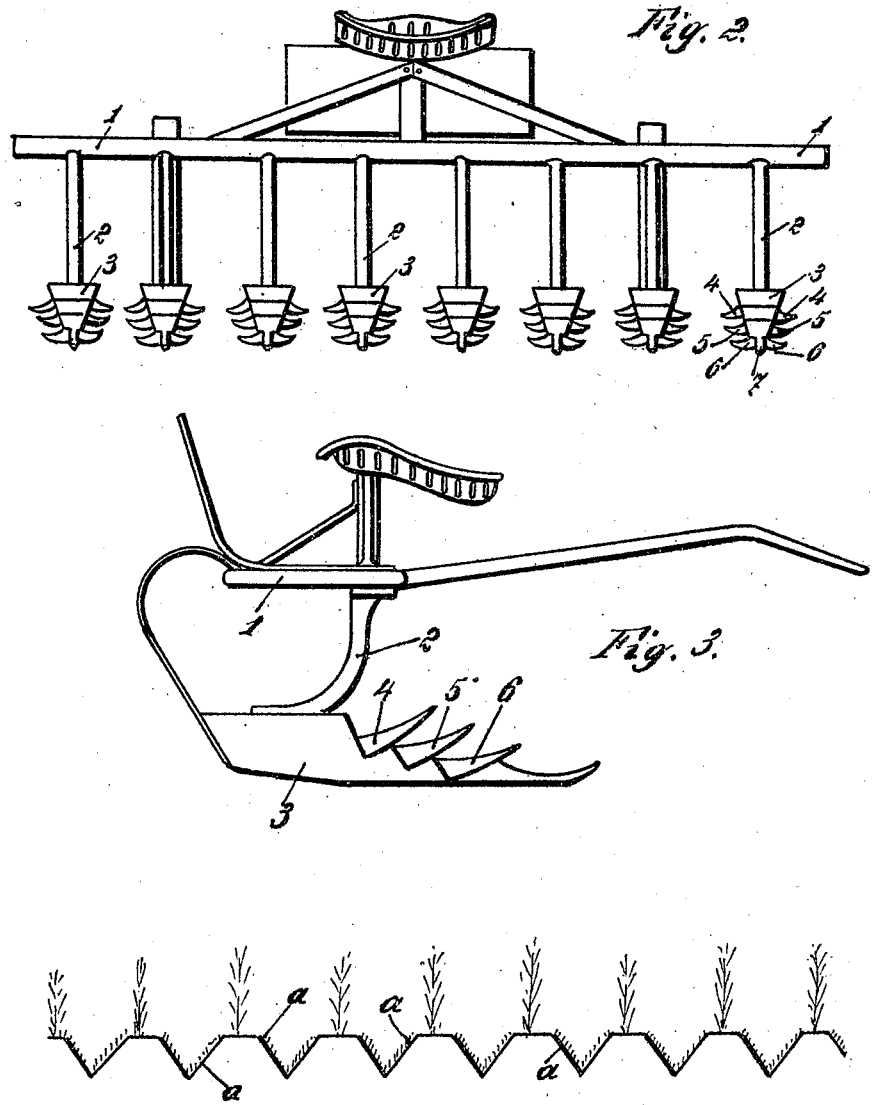
Fig. 1 is a cross section of the field rice.
Fig. 2 is an end elevational view of the machine forming the object of the invention.
Fig. 3 is a side elevational view of same.

The machine comprises a frame —1— provided with supports —2— for members —3— of tapered form and provided with wing cutters —4—5—6—, mounted at different level, laterally on said member.

While the members —3— travel in the furrows, said cutters abrade the sides of the furrows and cut or root out the weeds.

The tail cutters —7— complete the operation.

The member —3— has the shape adapted to the form of furrows, it derives directly from the furrowing member described in the above cited specification.

Having now particularly described and ascertained the nature of my invention and the manner in which the same should be performed, I claim:—

A sliding machine for weeding rice fields in soft and wet ground, comprising a frame, a plurality of supports mounted on said frame and projecting downwards and equally spaced apart, a sliding standard fastened on the end of each support and disposed horizontally, said standard being tapered rearward and having approximately a triangular cross section to fit the cross section of the furrow, and cutting members attached on the sides of said standards to cut the weeds on the sides of the furrows.

In testimony whereof I affixed signature.

CABRINI, ATTILIO.